F. G. & A. E. DIETERICH.
AVIATION MOTOR.
APPLICATION FILED JAN. 13, 1911.
990,712.
Patented Apr. 25, 1911.
3 SHEETS—SHEET 2.
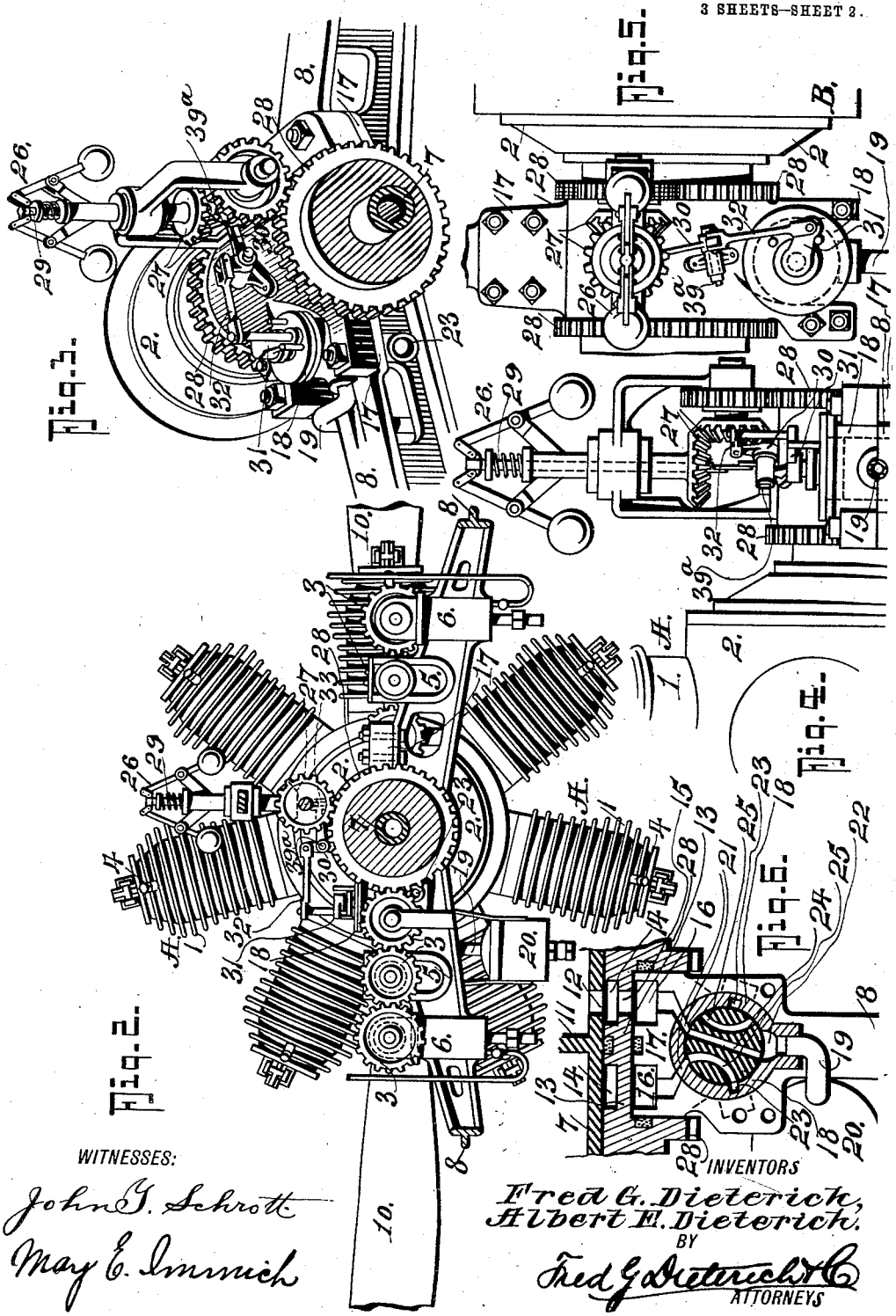
WITNESSES:
John J. Schrott
May E. Immich
INVENTORS
Fred G. Dieterich,
Albert E. Dieterich,
BY
Fred G. Dieterich & Co.
ATTORNEYS

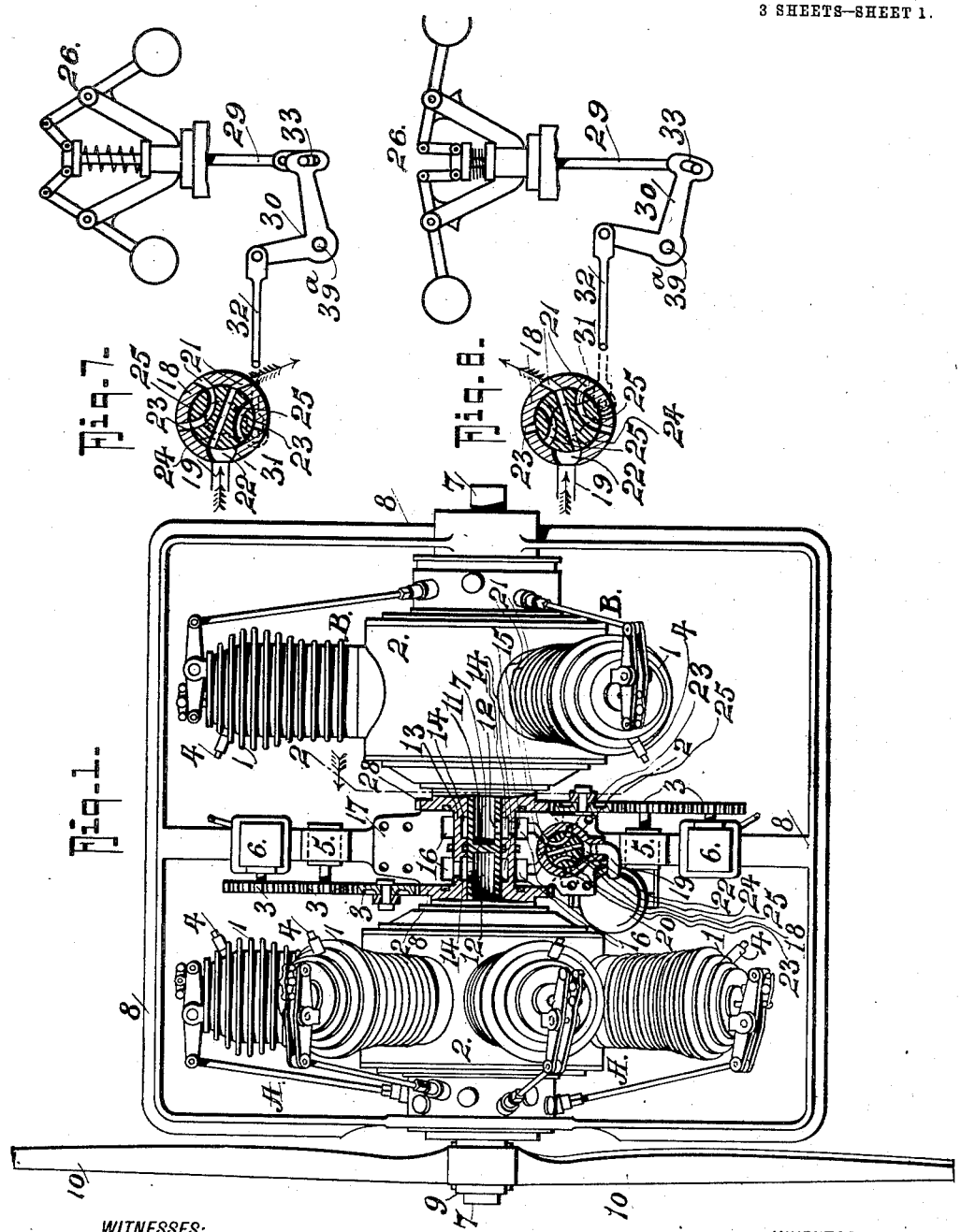

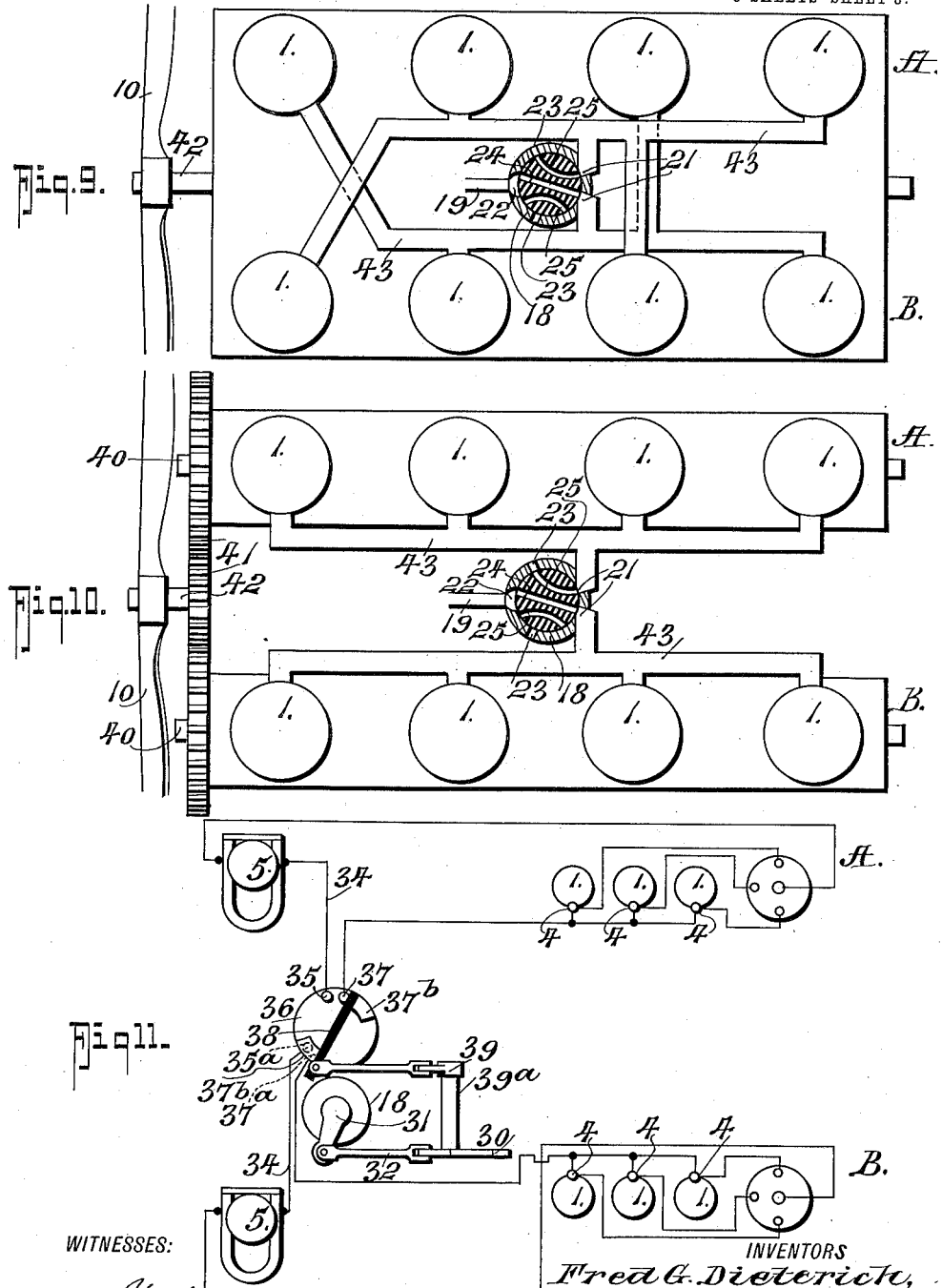

UNITED STATES PATENT OFFICE.

FRED G. DIETERICH AND ALBERT E. DIETERICH, OF WASHINGTON, DISTRICT OF COLUMBIA.

AVIATION-MOTOR.

990,712.  Specification of Letters Patent.  Patented Apr. 25, 1911.

Application filed January 13, 1911. Serial No. 602,462.

*To all whom it may concern:*

Be it known that we, FRED G. DIETERICH and ALBERT E. DIETERICH, both residing in the city of Washington, District of Columbia, have invented certain new and useful Improvements in Aviation-Motors, of which the following is a specification.

Our invention relates to the class of internal combustion motors that are more particularly adapted for use on flying machines or other aerial navigating machines, and the invention has for its object to provide a power plant in which there is always present a sufficient amount of reserve energy that is automatically brought into operation upon the failure of the main motive power when the operation of the same drops below a predetermined degree.

The invention further has for its object to provide a power plant in which there are present two separate and distinct power units each complete in itself, which units are coupled together whereby both units will be in motion at all times, mechanism being provided for supplying the units with working agent alternately and depending upon the speed of movement of the power transmitting shaft, the working agent being automatically shifted from one unit to the other, as conditions require. In other words, one unit is running "dead" while the other unit is running under power.

The invention further has for its object to provide a power plant in which there is a power unit complete in itself for operating the power transmitting shaft under all normal conditions which may be throttle-controlled between predetermined speed limits, and to further provide a second power unit complete in itself which may be throttle-controlled between other predetermined speed limits, and to provide means whereby when one of said power units arrives at the speed limit of the other power unit the first mentioned power unit will be cut out of operation and thereafter run "dead" while the second power unit will simultaneously be cut into operation and vice versa.

Our invention also has for its object to provide a power plant in which there is a main power unit that operates between predetermined speed limits to furnish transmitting power to the machine and in which there is a supplemental or reserved power unit that does not act as a motor while the main power unit is in operation, but which upon failure of the main power unit will be automatically brought into operation to drive the machine.

The invention includes the provision of means whereby the reserve power unit may be started up by the failing main power unit before it, the main power unit, becomes wholly disabled so that the power transmitted to the driven part is not interrupted or stopped during the operative change from the main power unit to the supplemental power unit.

The invention further has for its object to provide means whereby the supplemental power unit may be used in starting up the machine as a starter for the main power unit which will be automatically brought into operation after the driven part has arrived at a predetermined speed of operation and whereby the supplemental unit will be then automatically cut out and held in reserve.

In its generic nature our invention resides in providing a power plant for carrying out the objects aforesaid, and to this end the invention resides in those novel combinations, operations, arrangements and construction of parts which will be hereinafter fully described and then be specifically pointed out in the appended claims, reference being had to the accompanying drawings, in which:

Figure 1, is a top plan view and part horizontal section of the preferred form of our invention. Fig. 2, is a section on the line 2—2 of Fig. 1. Fig. 3, is an enlarged detail perspective view showing the speed controlled shifting valve for controlling the feed of working agent to the respective engine units to shift said feed from one to the other when the predetermined speed limits are reached. Fig. 4, is a side elevation on an enlarged scale of the mechanism shown in Fig. 3. Fig. 5, is a top plan view of the mechanism shown in Fig. 4. Fig. 6, is an enlarged detail sectional view of the shifting valve and its port connections. Figs. 7 and 8, are diagrammatic views showing the position of the shifting valve when the governor is in different positions. Figs. 9, 10 and 11, are diagrammatic views of modifications of the invention.

In carrying out our invention we mount the power units A and B in a suitable frame 8, the main unit A having a propeller hub 9 on the crank case 2, on which the propeller 10 is secured, in any desired manner. A common hollow crank shaft 7 is employed and between the two units, the shaft 7 has a web 11 that divides it into two parts. Adjacent to the web the shaft is apertured at 12—12, through which apertures the working agent is admitted to the respective engine crank cases. The crank cases 2—2 of the two units are connected by a hub 13 having annular channels 14 alining with openings 12, which channels receive working agent through the openings 15 that communicates with the chambers 16—16 in the bearing 17 of the frame 8.

18 designates a shifting valve whose sole purpose is to operatively connect and disconnect the working agent fuel supply pipe 19 from the common carbureter 20, with the respective units. The valve 18 has two feed ports 21 communicating with the respective chambers 16—16 of the bearing 17 and it has a single inlet port 22 into which the pipe 19 delivers. The valve casing also has ports 23—23 that communicate with the atmosphere. The cock of the valve has a feed passage 24 to effect communication between the inlet port 22 and one or the other of the feed ports 21, depending upon the position of the valve cock. The valve cock also has two other passages 25—25 for effecting communication between the air ports 23—23 and the respective feed ports 21—21, depending upon the position of the cock.

It is one of the purposes of our invention that the cock of the valve 18 be turned to connect and disconnect the fuel pipe 19 with one or the other power units only at a particular time, as when the propeller is turning at a predetermined number of revolutions. To this end, a centrifugal, or any other approved type of governor 26, may be employed and geared up at 27 with one of the gears 28 on one of the engine units.

The governor being designed to move the valve cock to a position to effect communication between the fuel pipe 19 and the hollow shaft section of the main unit A, when the propeller is traveling at and above a predetermined speed limit, and as soon as the speed drops below such predetermined limit the governor 26 will shift the valve 18 to cut off the fuel supply to the main unit A and turn it into the auxiliary unit B, whereby the auxiliary unit B will become the active power unit at speeds below a certain limit, while the main unit runs "dead" and vice versa. This may be accomplished by providing the shifting rod 29 of the governor with a bell crank lever 30 which is in turn joined to the valve lever 31 by a connecting rod 32, a slot 33 being provided in the bell crank lever 30 to allow a certain amount of movement of the governor rod 29 without affecting the position of the valve 18. Each unit is preferably complete in itself and embodies all the necessary parts to constitute an operative engine, such as the cylinders 1, the crank case 2, the valve gear 3, the spark plugs 4, magneto 5, oil pumps 6, etc.

The engine illustrated in the preferred form of our invention is of the well-known Gnome type, a type in which the crank shaft 7 is stationary and the engine cylinder 1, crank case 2 and the pistons and connecting rods (not shown) revolve around the shaft 7.

So far as shown the manner in which our invention operates is best explained as follows: Assume the main unit A is designed to operate under power impulses at speeds say, between 490 and 1500 revolutions, the speed between these limits being governed by the usual throttle control at the carbureter. Assume further that the auxiliary unit B is designed to operate between the lowest speed say, 100 and the maximum speed of 510 revolutions, the speed between these two limits being likewise controlled through the carbureter throttle valve in the usual manner. The governor mechanism will be designed to come into operation at say, a speed of 500 revolutions to shift the valve 18. When the engines are at rest, the governor will have moved the valve 18 to bring the parts into the position shown in Fig. 6, to connect the feed port of the main unit A with the atmosphere port, and to connect the feed port of unit B with the fuel intake pipe 19 and simultaneously disconnect it from the atmosphere port. Now, as soon as the operator starts the engine, in the usual manner, fuel will be admitted to unit B causing it to operate under power impulses. Unit A at this time will be running "dead" and acts simply as a fly wheel, it being understood that by putting the hollow shaft 7 of unit A into communication with the atmosphere when such unit is running "dead" the formation of a vacuum in the cylinders of unit A will be avoided. The aviator controls the speed by throttle in the usual manner. As soon as the speed of rotation of the propeller has arrived at say, 490 revolutions, the governor mechanism will begin to operate, the slot in the bell crank lever allowing a limited amount of lost motion so that the valve 18 will not be shifted until say, a speed of 500 revolutions has been made, at which time the governor shifts the valve 18 to cut off the supply of fuel to the unit B and turn it into the unit A and at the same time disconnecting shaft 7 of unit A from the atmosphere and connecting shaft 7 of unit B with atmosphere. The aviator continues throttling the engine through the medium of the throttle valve until the desired speed is reached. Assume that he opens the throttle valve until the maximum speed of 1500 revolutions is reached. Should, for any reason the unit A which is now in operation as the "live" unit (the unit B being the "dead" unit and acting as a fly wheel) become disabled (say by burning out of the spark plugs, clogging of the piston and exhaust valves, failure of operation of the ignition system of unit A, or any other cause) the speed of rotation of the engine and propeller will naturally rapidly fall. As soon as the speed has reached about 510 revolutions (the predetermined speed) the governor mechanism will begin to operate and as soon as the speed has been reduced to say 500 revolutions, the valve 18 will be shifted by the governor to disconnect the fuel supply from the unit A and connect unit A with atmosphere, at the same time disconnecting unit B from atmosphere and connecting it with the fuel supply, thereby bringing unit B into operation as the "live" unit, while unit A acts as the "dead" unit, or fly wheel.

While we prefer when engines of the type employing magnetos are used, to permit the ignition system of both engines as well as the respective valve gears to continue in operation at all speeds and simply change the fuel supply from one to the other at the predetermined speed, yet it may be found advantageous to connect and disconnect the ignition system of each unit. This may be readily accomplished by providing a common circuit switch between the respective magnetos of the respective engine units and their respective spark plugs and timers which may be controlled by the same mechanism that operates the valve 18 in much the same way. This arrangement is indicated in Fig. 11, whereby it will be seen the lead 34 from magneto 5 of unit A connects to contact 35 of switch 36 while contact 37 connects with the spark plugs 4 of unit A. Lead 34 from magneto 5 of unit B connects with contact 35ª of switch 36, while contact 37ª connects with spark plugs of unit B and contact plates 37ᵇ are on the arm 38 which is shifted by the crank 39 on the shaft 39ª on which bell crank 30 of the governor mechanism is mounted so that switch 36 and valve 18 operate harmoniously.

When engines of the reciprocating type are employed we prefer to employ such engines in units which contain two cylinders or multiples of two cylinders so as to provide as nearly as may be a balanced engine in each of the units. In Fig. 10 we have indicated our invention as applied to a pair of separate and distinct engines of the reciprocating type geared to a common propeller shaft. In this figure, A indicates the main unit and B, the auxiliary unit whose crank shafts 40 are geared at 41 with the propeller shaft 42. In this form of the invention the valve 18 connects with the respective fuel pipes 43 that go to the respective units A and B, the operation of valve 18 being by a governor mechanism driven from the shaft of one or the other of engines in a manner similar to that of the first form of our invention and a detailed illustration of such is thought to be unnecessary.

In Fig. 9 is diagrammatically shown a further modification in which engines of the V type are employed, that is where two sets of cylinders are provided 90° apart, operating on a common crank shaft to which the propeller may be attached. In this form of our invention the same general arrangement between the inlets and the valve 18 may be employed, as in the preceding form, but whenever an engine of this type is used, we prefer to connect the cylinders so that one-half of the cylinders on one side will operate in connection with one-half of the cylinder on the other side and vice versa, thereby maintaining a balanced condition of the engine, as is best illustrated in Fig. 9 of the drawings.

Numerous other modifications of the invention and adaptations of the same to various types of engine will suggest themselves to those skilled in the art. Instead of employing the governor mechanism for shifting the supply of fuel from one unit to the other, at predetermined speeds, the cock of the valve 18 may be manually shifted by the aviator in any desired way, and furthermore by providing latches or stops to coöperate with the governor mechanism or the valve 18, after the valve 18 has once shifted from one position to another, it may be locked and prevented from shifting back in the event that the engine races above the predetermined speed limit. We prefer, however, to employ a mechanism whereby the shifting of the fuel supply from one unit to another is wholly automatic and out of control of the operator.

The engine disclosed, as indicated in the preferred form shown in the drawings, wherein the greater power unit has the greater number of cylinders and the slower speed unit the lower number of cylinders, the power plant becomes, as it were, a self-regulating one. Slow speed engines require heavier fly wheels than fast speed engines. Thus unit B when operating under power impulses has a greater fly wheel in the shape of unit A running "dead" than does unit A when it is operating under power impulses and unit B is running "dead." Again, assume the engine unit A is running under maximum speed and the aviator desires to alight, it is only necessary for him to begin to close the throttle valve of the carbureter when the speed of the engine will drop. As soon as the speed has reached the predetermined amount, the valve 18 is shifted to render unit B the active unit and the aviator by continuing to close the throttle valve, after the speed has been reduced to 500 revolutions, can shut down unit B. In starting the machine it will also be noticed that unit B acts as the starter. Again, it will be observed the use of our invention on flying machines will largely reduce the danger due to failure of the engine to operate, for the reason that the aviator has one reserve unit and as soon as one unit A becomes disabled he can immediately tell by the reduced speed of the machine that trouble has occurred. Unit B becomes automatically shifted into operation as reserve power and the aviator can then effect a landing under the power generated by unit B. It is our intention that unit B be simply a starting unit and an auxiliary unit on which the aviator can fall back automatically in case the main power unit becomes disabled, so as to enable the aviator to effect a landing in as safe a manner as possible.

If desired when engines of the rotary cylinder type are employed instead of having the cylinders of the two units mounted on separate crank cases with the valve 18 between the two units as shown in the drawings, the two units may have a common crank case on which all the cranks are mounted, in which event the valve 18 would be located at one end of the shaft 7, as would also the respective magnetos, oil pumps, etc., the crank case being centrally divided into two sections for the respective sets of cylinders and the fuel feed will be controlled separately to the two crank case sections.

From the foregoing description taken in connection with the accompanying drawings, it is thought the complete construction of our invention will be readily understood by those skilled in the art.

We do not desire to limit ourselves to the precise construction disclosed, as numerous changes in the details for carrying out our invention will suggest themselves to those skilled in the art and will depend largely upon the particular type of engine.

What we claim is,

1. In a power plant, two separate and distinct engine units each complete in itself and coupled to move together, combined with a source of fuel supply, means for mechanically shifting the supply of fuel from one unit to the other and vice versa to cause one unit to be "dead" while the other unit is "live" one of said units operating below a predetermined speed and the other unit operating above a predetermined speed.

2. In a power plant, two separate and distinct engine units each complete in itself, means for coupling said units to move together, combined with a source of fuel supply and speed controlled means for mechanically shifting the supply of fuel from one unit to the other and vice versa to cause one unit to run "dead" indefinitely while the other unit runs "live" indefinitely and vice versa.

3. In a power plant, two distinct units, a source of fuel supply including a throttle valve for controlling the speed of operation of said engine units, and a shifting valve, said shifting valve having ports for supplying fuel to either of said units depending on the position of said shifting valve, means for shifting said shifting valve to supply fuel first to one unit and then to the other.

4. In a power plant, two separate units, a source of fuel supply including a throttle valve for controlling the speed of operation of said engine units, a shifting valve, said shifting valve having ports for supplying fuel to either of said units depending on the position of said shifting valve, means for shifting said shifting valve to supply fuel first to one unit and then to the other, and means coupling said units together whereby the momentum of the unit into which fuel is being supplied, will operate the other unit during the shifting of the valve to supply fuel to said other unit.

5. In a power plant, two distinct units, a source of fuel supply including a throttle valve for controlling the speed of operation of said units, a shifting valve, said shifting valve having ports for supplying fuel to either of said units depending on the position of said shifting valve, means for shifting said shifting valve to supply fuel first to one unit and then to the other and means whereby the "live" unit will insure the starting of the other unit upon the shifting of said shifting valve to change the fuel supply to said other unit.

6. In a power plant, two distinct engine units, a source of fuel supply including a throttle valve for controlling the speed of operation of said units, a shifting valve, said shifting valve having ports for supplying fuel to either of said units depending on the position of the same, means for shifting said shifting valve to supply fuel first to one unit and then to the other and means whereby the "live" unit will insure the starting of the other unit upon the shifting of said shifting valve to change the fuel supply to said other unit, and thereby cut off the supply of fuel to the first unit.

7. In a power plant, two separate and distinct engine units each complete in itself; a common source of fuel supply, and a shifting valve for directing the flow of fuel from the source of supply to one or the other units, the unit to which fuel is supplied being the "live" unit and the other being the "dead" unit, an automatically actuated mechanical device for shifting said valve to supply fuel alternately to said units.

8. In an internal combustion engine power plant, two engine units each complete in itself and embodying all the necessary parts to constitute an operative whole, combined with mechanically actuated speed governed devices for alternately supplying fuel to said units at predetermined speeds of operation.

9. In an internal combustion engine power plant, two engine units each complete in itself and embodying all the necessary parts to constitute an operative whole, combined with mechanically actuated speed controlled devices for alternately supplying fuel to said units at predetermined speeds of operation, and means for starting the movement of the unit to which fuel is newly supplied by the momentum of the unit from which the fuel supply is cut off.

10. In an internal combustion engine power plant, two engine units each complete in itself and embodying all the necessary parts to constitute an operative whole, combined with mechanically actuated speed controlled devices for alternately supplying fuel to said units at predetermined speeds, means for starting the movement of the unit to which fuel is newly supplied by the momentum of the unit from which the fuel supply is cut off, said last named means including a coupling between said units whereby both of said units will move together.

11. The combination with two balanced engine units, one unit operating between predetermined low speed limits and the other operating between predetermined high speed limits, means for supplying fuel to said low speed unit to cause it to run "live" while said high speed unit runs "dead", and means operating when the higher limit of speed of said low speed unit is reached for shifting the supply of fuel from said low speed unit to said high speed unit to cause said high speed unit to run "live" and said low speed unit to run "dead".

12. The combination with two balanced engine units, one unit operating between predetermined low speed limits and the other operating between predetermined high speed limits, means for supplying fuel to said low speed unit to cause it to run "live" while said high speed unit runs "dead", and means operating when the higher limit of speed of said low speed unit is reached for shifting the supply of fuel from said low speed unit to said high speed unit to cause said high speed unit to run "live" and said low speed unit to run "dead", and to further shift the supply of fuel from said high speed unit to said low speed unit when the speed of said high speed unit drops below its minimum limit.

13. In a power plant of the character stated, two engine units, one of said units being designed to operate below a predetermined speed and the other of said units being designed to operate above a predetermined speed, and means, operative at such predetermined speed, for supplying fuel to one or the other of said units according as the speed of operation increases or diminishes from said predetermined speed.

FRED G. DIETERICH.
ALBERT E. DIETERICH.

Witnesses:
 GEO. B. PITTS,
 HAYWARD WOODARD.